United States Patent
Huang et al.

(10) Patent No.: US 9,937,463 B2
(45) Date of Patent: Apr. 10, 2018

(54) GAS SEPARATION APPARATUS AND PACKING

(71) Applicant: IHI Corporation, Koto-ku (JP)

(72) Inventors: JIan Huang, Tokyo (JP); Shinsuke Matsuno, Tokyo (JP); Atsushi Murakami, Tokyo (JP); Yoshiyuki Iso, Tokyo (JP); Mariko Katou, Tokyo (JP); Kenji Takano, Tokyo (JP); Naoki Fujiwara, Tokyo (JP)

(73) Assignee: IHI Corporation, Koto-ku (JP)

( * ) Notice: Subject to any disclaimer, the term of this patent is extended or adjusted under 35 U.S.C. 154(b) by 0 days.

(21) Appl. No.: 14/162,445

(22) Filed: Jan. 23, 2014

(65) Prior Publication Data

US 2014/0131902 A1    May 15, 2014

Related U.S. Application Data

(63) Continuation of application No. PCT/JP2012/069183, filed on Jul. 27, 2012.

(30) Foreign Application Priority Data

Jul. 28, 2011 (JP) ................................. 2011-165326

(51) Int. Cl.
*B01F 3/04* (2006.01)
*B01D 53/18* (2006.01)
(Continued)

(52) U.S. Cl.
CPC ....... *B01D 53/185* (2013.01); *B01D 53/1475* (2013.01); *B01D 53/1493* (2013.01);
(Continued)

(58) Field of Classification Search
CPC .............. B01D 53/185; B01D 53/1475; B01D 53/1493; B01D 53/62; B01D 2252/103;
(Continued)

(56) References Cited

U.S. PATENT DOCUMENTS 2,003,271 A * 5/1935 Beimann et al. ............. 261/111
2,206,440 A * 7/1940 Walker ....................... 261/112.1
(Continued)

FOREIGN PATENT DOCUMENTS

DE    1 226 077 B    10/1966
EP    0 130 745 A2    1/1985
(Continued)

OTHER PUBLICATIONS

International Search Report dated Nov. 13, 2012 for PCT/JP2012/069183 filed on Jul. 27, 2012 with English Translation.
(Continued)

*Primary Examiner* — Charles Bushey
(74) *Attorney, Agent, or Firm* — Oblon, McClelland, Maier & Neustadt, L.L.P.

(57) ABSTRACT

Provided is a gas separation apparatus advantageous in suppression of increase in pressure loss and achievement of reduced size and weight, thereby reducing costs. The gas separation apparatus causes an absorbent to flow down along the surface of a packing arranged in a treatment chamber, and supplies to the treatment chamber a gas to be treated which contains a target gas component, and then causes the gas to be treated and the absorbent flowing down along the surface of the packing to come into gas-liquid contact. Thus the target gas component contained in the gas to be treated is absorbed into the absorbent and separated or recovered from the gas to be treated. The packing has at least one packing unit configured by a plurality of expanded metal plates standing vertically and being aligned.

19 Claims, 8 Drawing Sheets

(51) Int. Cl.
     *B01D 53/62*   (2006.01)
     *B01D 53/14*   (2006.01)
     *B01J 19/32*   (2006.01)

(52) U.S. Cl.
     CPC .............. *B01D 53/62* (2013.01); *B01J 19/32* (2013.01); *B01D 2252/103* (2013.01); *B01D 2252/204* (2013.01); *B01D 2252/20405* (2013.01); *B01D 2252/20421* (2013.01); *B01D 2252/20484* (2013.01); *B01D 2257/504* (2013.01); *B01D 2258/0283* (2013.01); *B01J 2219/322* (2013.01); *Y02C 10/04* (2013.01); *Y02C 10/06* (2013.01)

(58) Field of Classification Search
     CPC ........... B01D 2252/20405; B01D 2252/20421; B01D 2252/20484; B01D 2257/504; B01D 2258/0283; B01D 2252/204; B01J 19/32; B01J 2219/322; Y02C 10/06; Y02C 10/04
     USPC .............................. 261/112.1, 112.2, DIG. 72
     See application file for complete search history.

(56) References Cited

U.S. PATENT DOCUMENTS

| | | | | |
|---|---|---|---|---|
| 3,010,706 | A * | 11/1961 | McWilliams | 261/100 |
| 3,346,246 | A * | 10/1967 | Loetel et al. | 261/103 |
| 3,687,818 | A | 8/1972 | Porter et al. | |
| 3,782,703 | A * | 1/1974 | Kolar | 261/112.1 |
| 4,105,724 | A * | 8/1978 | Talbot | 261/112.1 |
| 4,304,738 | A * | 12/1981 | Nutter | 261/94 |
| 4,501,707 | A | 2/1985 | Bohlmann | |
| 4,562,015 | A * | 12/1985 | Lefevre | 261/94 |
| 4,762,650 | A * | 8/1988 | Bosman | 261/100 |
| 4,950,430 | A | 8/1990 | Chen et al. | |
| 5,536,454 | A | 7/1996 | Fujii et al. | |
| 6,511,051 | B2 * | 1/2003 | Kessler | 261/94 |
| 6,715,740 | B2 * | 4/2004 | Engh et al. | 261/112.1 |
| 8,827,248 | B2 * | 9/2014 | Short | 261/112.1 |
| 2006/0185516 | A1 * | 8/2006 | Moriyama | B01D 53/62 96/234 |
| 2009/0151915 | A1 | 6/2009 | Short | |

FOREIGN PATENT DOCUMENTS

| | | |
|---|---|---|
| FR | 869527 | 11/1941 |
| JP | 55-139822 A | 11/1980 |
| JP | 58-11001 A | 1/1983 |
| JP | 63-151331 A | 6/1988 |
| JP | 06-210121 A | 8/1994 |
| JP | 06-269628 A | 9/1994 |
| JP | 07-100324 A | 4/1995 |
| JP | 07-121357 B2 | 12/1995 |
| JP | 5704238 | 3/2015 |

OTHER PUBLICATIONS

International Written Opinion dated Nov. 13, 2012 for PCT/JP2012/069183 filed on Jul. 27, 2012.

Microfilm of the specification and drawings annexed to the request of Japanese Utility Model Application No. 012290/1979 (Laid-open No. 111598/1980), Tsutsunaka Plastic Industry Co., Ltd., Aug. 5, 1980 (with partial English Translation).

Extended European Search Report dated Apr. 22, 2015 in Patent Application No. 12817565.0.

Japanese Office Action dated Oct. 27, 2015 in Japanese Patent Application No. 2014-526781 (with English Translation).

Extended European Search Report dated Mar. 3, 2016 in European Application No. 13822200.5.

SECUREX High Security Expanded Metal Fencing, Niles Fence and Security, LLC, Feb. 2017.

Raised (Regular) Expanded, Flat Expanded, Grating (Regular Diamond) / Catwalk (Reverse Diamond) Chart, All Metals Supply, Jul. 2017.

Expanded Metal & Grating, available at alro.com, Feb. 2017.

Standard Expanded Metal Product Details and Flattened Expanded Metal Product Details, McNichols, available at http://www.mcnichols.com/content.htm?contentID=13954, Feb. 2017.

Expanded Metal Grating. Metro (Oct. 14, 2016).

* cited by examiner

GAS SEPARATION APPARATUS AND PACKING

CROSS REFERENCE TO RELATED APPLICATIONS

This application is a continuation application of International Application No. PCT/JP2012/069183, filed on Jul. 27, 2012, which claims priority of Japanese Patent Application No. 2011-165326, filed on Jul. 28, 2011, the entire contents of which are incorporated by references herein.

BACKGROUND OF THE INVENTION

Field of the Invention

The present invention relates to a gas separation apparatus that separates a specific target gas component contained in a gas to be treated, by causing an absorbent to absorb the specific target gas component, and to a packing used therein, and in particular, relates to a gas separation apparatus which brings a gas to be treated such as an exhaust gas into gas-liquid contact with an absorbent and which causes the absorbent to absorb a specific gas component such as carbon dioxide contained in the gas to be treated so as to separate or recover it from the gas to be treated, being useful as a carbon dioxide recovery apparatus, a gas cleaning device to remove a toxic gas, or a separation apparatus to separate a specific gas component from a mixed gas, and to a packing used therein.

Description of the Related Art

Gas separation apparatuses that separate, remove, or recover a specific gas from a gas to be treated such as an exhaust gas containing various kinds of oases, by using gas-liquid contact, have been used in chemical plants or thermal power stations. In a carbon dioxide recovering apparatus, for example, carbon dioxide is separated by absorption that is caused by an absorbent such as an aqueous monoethanolamine solution being brought into gas-liquid contact with a gas containing carbon dioxide, and the carbon dioxide is recovered by heating the absorbent after absorption as well as bringing it into gas-liquid contact to release carbon dioxide into a gas phase. Also in a gas cleaning device to remove a toxic gas component from an exhaust gas or a gas separation apparatus to separate a specific gas component from a mixed gas, a specific gas component is absorbed by an absorbent by using gas-liquid contact. An apparatus for performing gas-liquid contact has a packing for increasing the contact area of the absorbent and the gas, and a specific gas component in the gas is absorbed by bringing the absorbent and the gas into gas-liquid contact on the surface of the packing.

However, in some cases, the absorbent may not flow uniformly on the surface of the packing under the influence of surface tension, and a liquid film of the absorbent flowing on the surface of the packing may be converged to decrease the contact area of the absorbent and the gas. In the case where the gas-liquid contact area decreases, even when the supply flow rate of the absorbent is the same, the absorbent converges on the packing and the velocity of flow increases so that the residence time of the absorbent on the surface of the packing becomes shorter. As a result, a problem is posed that the amount of absorption through contact of the absorbent and the gas is reduced.

Therefore, in a gas-liquid contact device described in Publication Document 1, the gas-liquid contact surface of the packing is configured to be formed of either of a rough surface portion whose average roughness of the center line is 50 μm or more, a porous surface portion having a plurality of perforation holes, or a cancellous object, to increase the gas-liquid contact area.

In a gas-liquid contact device described in Publication Document 2, the gas-liquid contact surface is configured by a material in which a cancellous body is stuck to the surface of a plate, to increase the gas-liquid contact area.

In a gas-liquid contact device described in Publication Document 3, the gas-liquid contact portion is configured by a gas-liquid contact unit in which many three-dimensional knits made of fabric are arrayed vertically or substantially vertically.

In a gas-liquid contact device described in Publication Document 4, a plurality of cancellous bodies which are large enough to cover the cross section of a gas-liquid contact region are disposed and fixed at intervals in the traveling direction of a mixed gas. Publication Document 4 also describes that the cancellous body may be configured by an expanded metal. According to this literature, a part of the injected liquid is scattered after striking the surface of the linear portions forming the mesh of the cancellous body, and the rest part of the injected liquid covers a side face of the linear portions like a thin film and flows down along the side face while it comes into contact with the mixed gas to generate aerosol.

DOCUMENTS LIST

Publication Document 1: Japanese Patent Application Laid-Open (JP-A) No. 6-210121
Publication Document 2: JP-A No. 6-269628
Publication Document 3: Japanese Patent Application Publication (JP-B) No. 7-121357
Publication Document 4: JP-A No. 7-100324

BRIEF SUMMARY OF THE INVENTION

However, according to the technologies described in Publication Document 1 to Publication Document 3, takes a lot of time to process the packing, thus posing a problem of significantly increased costs. Particularly, the cancellous body such as a wire net and three-dimensional knit is structurally soft and thus, it is difficult to stand it alone and its shape is easily distorted when the treatment is performed with it installed upright. Accordingly, a support member of the plate or the like is needed and a problem of an increased weight of the packing as a whole is caused. By the increased weight of the packing, the support structure for the packing also increases in weight and it is enlarged.

According to the technology described in Publication document 3 or Publication Document 4, the direction in which the gas flows is horizontal in the packing, or the packing is stacked so as to be substantially perpendicular to the direction in which the gas flows. Therefore, the packing blocks the flow of gas and the pressure loss increases, leading to a problem of degraded energy efficiency.

The present invention has been made in view of the above problems, and an object thereof is to provide a gas separation apparatus which is capable of realizing good gas-liquid contact and absorption while suppressing an increase in pressure loss in the gas-liquid contact and which is capable of suppressing distortion of the shape when treating with upright installation and of reducing the weight, resulting in reduction of the manufacturing cost and operation cost, and a packing used for it.

To solve the above problems, according to an aspect of the present invention, a gas separation apparatus is such a gas separation apparatus that causes an absorbent to flow down along a surface of a packing arranged in a treatment chamber and supplies to the treatment chamber a gas to be treated containing a target gas component so that the absorbent flowing down along the surface of the packing and the gas to be treated are brought into gas-liquid contact, thereby the target gas component contained in the gas to be treated is absorbed in the absorbent to separate or recover from the gas to be treated, wherein the packing comprises at least one packing unit formed of a plurality of expanded metal plates standing vertically and being aligned.

In addition, according to an aspect of the present invention, there is provided a packing for use in a gas separation apparatus that causes an absorbent to absorb a target gas component contained in a gas to be treated, in such a manner that the absorbent flows down along a surface of the packing to bring the absorbent and the gas to be treated into sufficient contact, the packing comprising at least one packing unit comprising a plurality of expanded metal plates standing vertical and being aligned.

The packing unit may comprise a gathering member that gathers the plurality of expanded metal plates in an aligned state, a spacer to provide a fixed interval between the plurality of expanded metal plates, and an annular member that surrounds an outer circumference of the plurality of expanded metal plates to integrally fix the plurality of expanded metal plates. A penetration member that penetrates the plurality of expanded metal plates is possibly used as the gathering member and the plurality of expanded metal plates may be formed to have a through hole to allow the penetration member to penetrate, so that a raised portion formed at an edge of the through hole by bending a part of strands constituting the plurality of expanded metal plates so as to stand in a plate thickness direction is possibly used as the spacer.

The plurality of expanded metal plates are formed of strands which are inclined at an angle $\theta$ ($0<\theta\leq 90°$) with respect to a vertical direction and it is possible to suitably use such one that the angle $\theta$ is 48 to 73°.

When the target gas component is carbon dioxide and the absorbents, for example, an aqueous amine compound solution, the gas separation apparatus is possibly applied to an absorber of a carbon dioxide recovery apparatus.

According to the above-mentioned gas separation apparatus of the present invention, it is possible, by employing an expanded metal for the packing, to configure a packing of a plate shape that has a certain strength even having many openings, and distortion of the shape is possibly inhibited also with installing the packing alone erected upright to use for treatment. Therefore, there is no need to use a member that supports the free-standing body of packing and it is possible to reduce the weight, the size and costs. Also, it is easy to process and assemble the packing and therefore, a gas separation apparatus with high absorption efficiency can be provided at low manufacturing costs.

In addition, since mass transfer and material exchange can be promoted in a liquid film, it is possible not only to improve absorption efficiency of the absorbent, but also to reduce the amount of absorbent that does not contribute to absorption of the target gas component, so that the treatment cost can be reduced. Further, a sufficient gas-liquid contact area and contact time can be secured and the absorption efficiency can be improved without enlarging the apparatus in size.

In addition, because distortion of the shape during treatment with installing the thin-plate packing upright can be prevented, the channel of gas flow is not blocked due to deformation of the packing and the channel of gas flow can always be secured and therefore, an increase of pressure loss in a gas distribution can be inhibited and degradation in energy efficiency can be suppressed.

Therefore, a gas separation apparatus with high energy efficiency can be provided and the weight of the apparatus can be reduced, so that the manufacturing cost and operation cost can be reduced.

BRIEF DESCRIPTION OF THE DRAWINGS

The features and advantages of the gas separation apparatus and the packing used therein according to the present invention will more clearly understood from the following description of the conjunction with the accompanying drawings in which identical reference letters designate the same or similar elements or cases throughout the figures and in which:

FIGS. 1A and 1B show a first embodiment of a gas separation apparatus according to the present embodiment, wherein FIG. 1A is an overall schematic diagram, and FIG. 1B is a partial enlarged view of a packing;

FIGS. 3A to 3C are an explanatory views of the packing shown in FIGS. 1A and 1B, wherein FIG. 3A is a horizontal sectional view, FIG. 3B is a vertical sectional view, and FIG. 3C shows a modification of a spacer;

DETAILED DESCRIPTION OF THE INVENTION

Figure 1A:
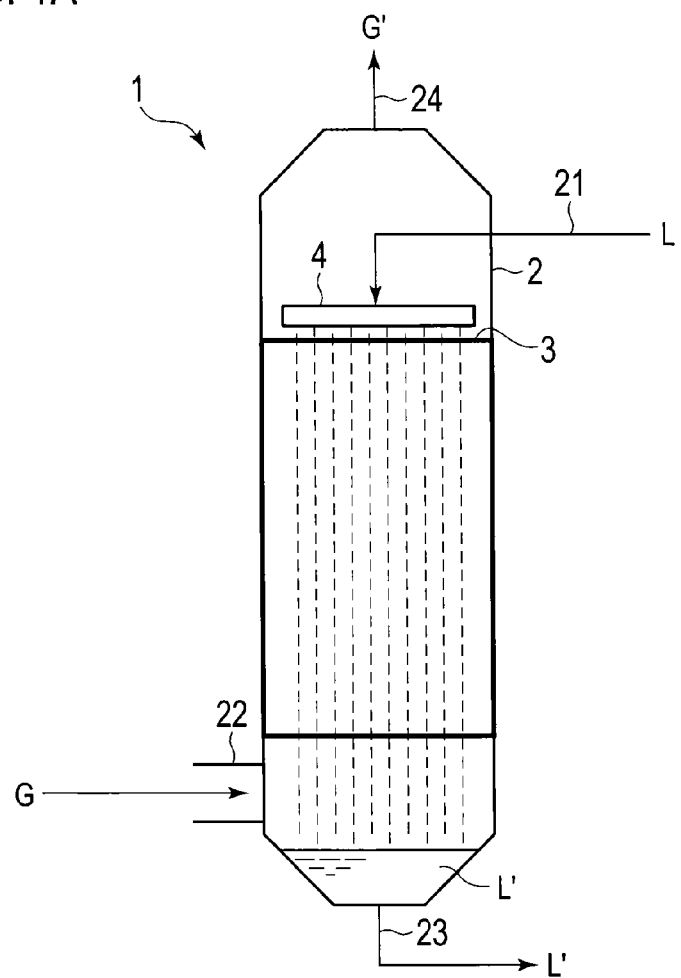
Figure 1B:
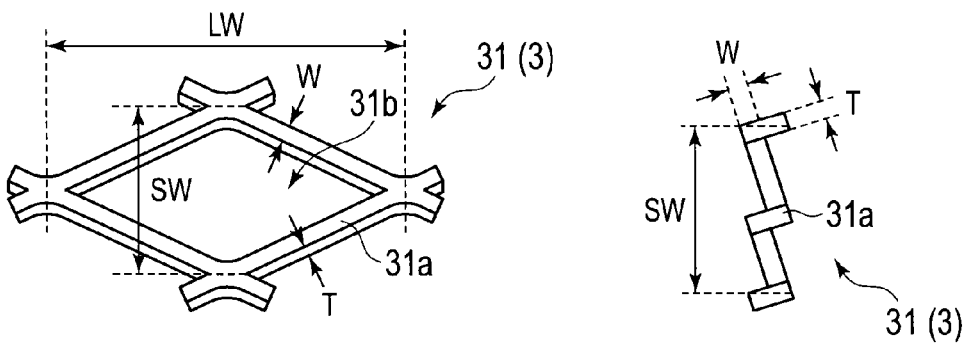
Figure 2:
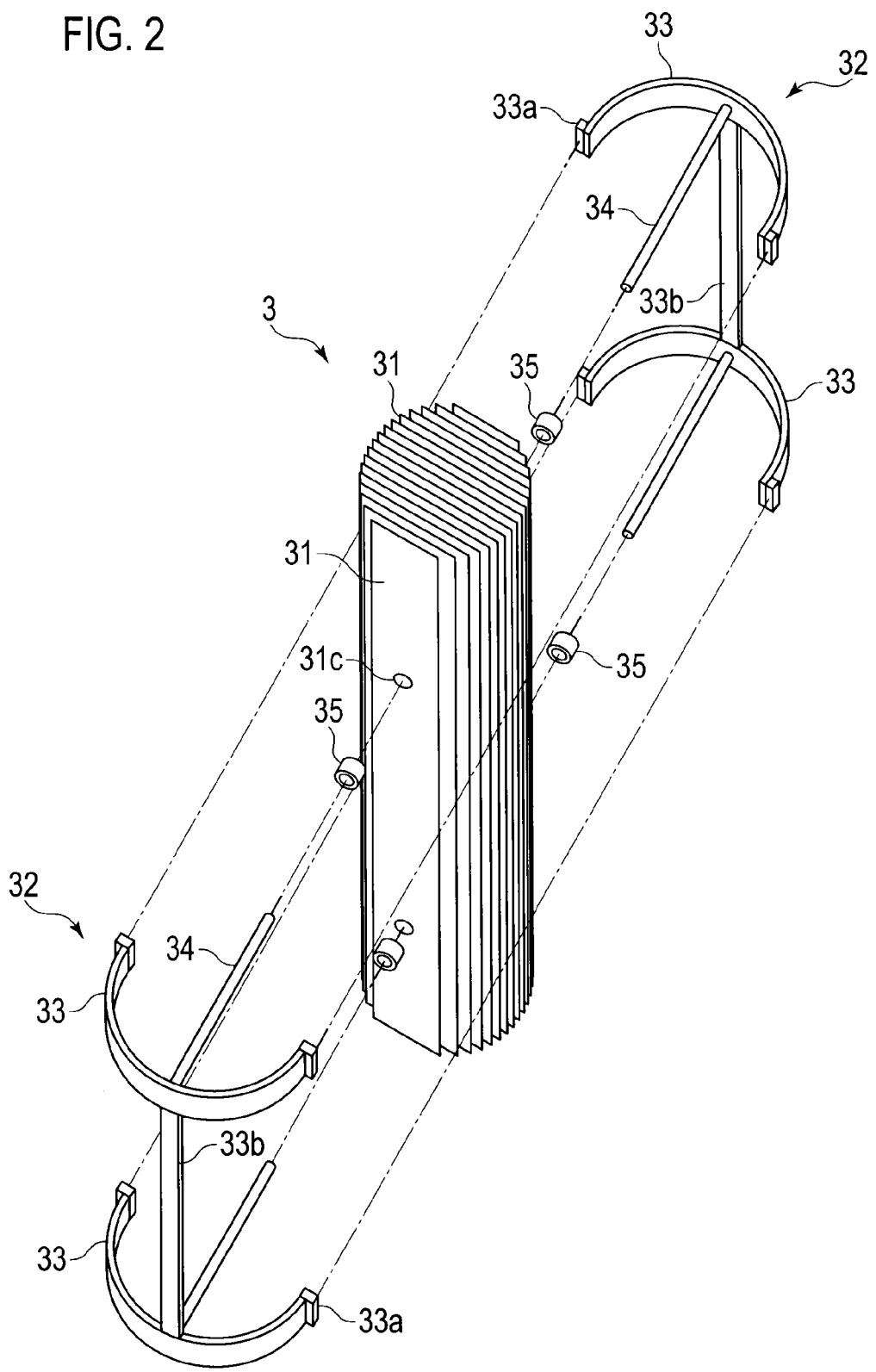
FIG. 2 is an exploded perspective view of the packing shown in FIG. 1.
Figure 3A:
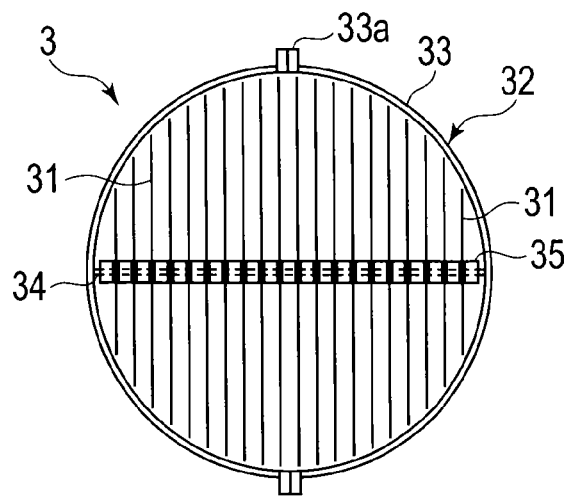
Figure 3B:
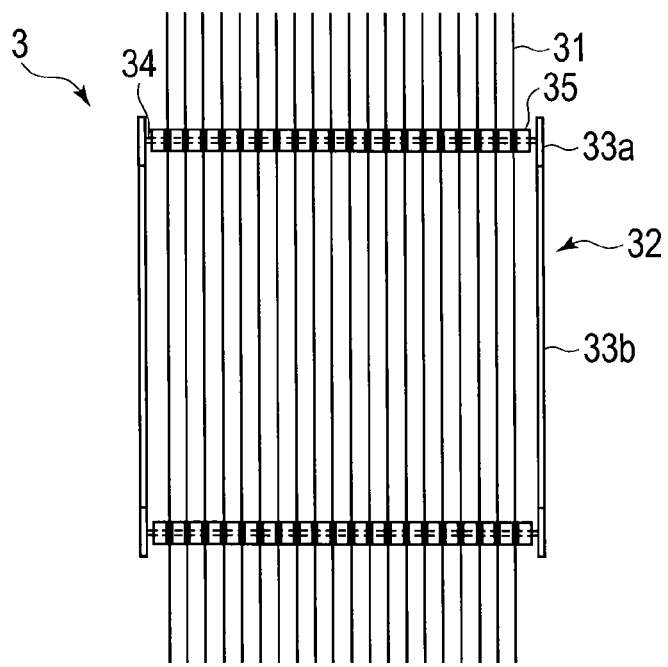
Figure 3C:
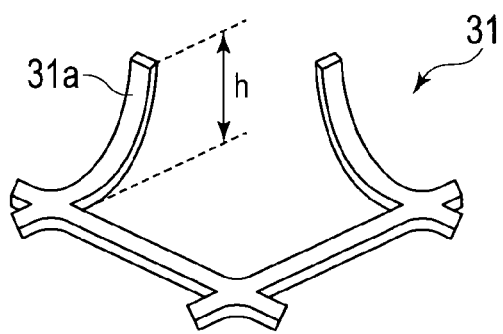

The first embodiment of the present invention will be described below, using FIGS. 1 to 5. FIGS. 1A and 1B are a diagram showing a gas separation apparatus according to the first embodiment of the present embodiment, wherein FIG. 1A shows an overall configuration diagram, and FIG. 1B shows a partial enlarged view of a packing. FIG. 2 is an exploded perspective view of the packing shown in FIG. 1. FIG. 3 is an explanatory view of the packing shown in FIG. 1, wherein FIG. 3A shows a horizontal sectional view, FIG. 3B shows a vertical sectional view, and FIG. 3C shows a modification of a spacer. This embodiment is configured as a gas separation apparatus when used as an absorber of a carbon dioxide recovery apparatus, and carbon dioxide contained in an exhaust gas is absorbed by an absorbent through gas-liquid contact between the exhaust gas and the absorbent.

In a gas separation apparatus 1 in the first embodiment of the present invention, as shown in FIGS. 1A and 1B, an absorbent L is caused to flow down along the surface of a packing 3 arranged in a treatment chamber 2 and also a gas to be treated (untreated gas) G containing a target gas component is supplied into the treatment chamber 2 to separate or recover the target gas component from the gas to be treated G by bringing a liquid film of the absorbent L formed on the surface of the packing 3 and the gas to be treated G into gas-liquid contact to cause the absorbent L to absorb the target gas component. For the packing 3, at least one packing unit constituted by a plurality of expanded metal plates 31 standing vertically and being arranged in parallel is used. One packing unit is used in the present embodiment, but a plurality of packing units may be arranged side by side or piled up in the vertical in accordance with the design of the apparatus structure. When piling up the filing units in the vertical, it is advisable to arrange them in such a manner that the aligned directions of the expanded metal plates 31 cross between one unit and another unit mounted thereon.

The treatment chamber 2 has a substantially cylindrical shape and forms an outer shell of the gas separation apparatus 1. An absorbent supply line 21 is connected to an upper portion of the treatment chamber 2 as a supply portion to supply the absorbent L into the gas separation apparatus 1. The absorbent L may directly be supplied to the absorbent supply line 21 after being purified (regenerated) in facilities of a chemical plant or thermal power station, or may be supplied to the absorbent supply line 21 from a liquid-storage tank that temporarily stores the purified absorbent L. The absorbent supply line 21 is further connected to a sprinkling tube 4 disposed horizontally above the packing 3. The sprinkling tube 4 is formed in such a shape that is capable of distributing the absorbent in spiral, annular, parallel (meandering), or grid shape above the packing 3, and many openings allowing the absorbent L to be discharged are formed on the lower face thereof. It is noted that the sprinkling tube 4 is not limited to the illustrated structure and a sprinkling device that has commonly been used such as the shower head, spray nozzle and straw nozzle may appropriately be employed.

In addition, a gas supply pipe 22 provided for introducing the gas to be treated G into the gas separation apparatus 1 and supplying it to the packing 3 is connected to a lower portion of the treatment chamber 2. The gas to be treated G is a gas containing carbon dioxide such as, for example, a combustion waste gas (exhaust gas) generated in facilities of a chemical plant or thermal power station, a reactant gas after use in fuel gasification of coal and the like, and it is supplied to the gas supply pipe 22 from the facilities mentioned above. Here, a counter-current configuration in which the absorbent L is caused to flow downward from the upper side of the treatment chamber 2 and the gas to be treated G is sent upward from the lower side of the treatment chamber 2 is adopted, but the present embodiment is not limited to such a configuration and, for example, a parallel-flow type in which the gas to be treated G is also sent downward from the upper side of the treatment chamber 2 may also be adopted.

A discharge line 23 to recover a used absorbent L' is connected to the bottom of the treatment chamber 2. The used absorbent L' after passing through the packing 3 and getting contact with the gas to be treated G is temporarily stored at the bottom of the treatment chamber 2 and then appropriately discharged to the outside through the discharge line 23 for recovery. The used absorbent L' recovered can be reused after regeneration by a stripper (regeneration tower) that causes the used absorbent L' to emit carbon dioxide by heating it with use of a heat source such as steam.

A gas discharge line 24 that discharges a treated gas G' from which a target gas component has been removed is connected to a ceiling portion of the treatment chamber 2. The treated gas G' after passing through the packing 3 and getting contact with the absorbent L can be released to the atmosphere from a chimney or can undergo further treatment after being transported to other treatment facilities prepared as occasion arises.

In addition, a cooling device that recovers a vaporized absorbent from the treated gas through condensation can be arranged in the treatment chamber 2, as necessity arises.

The packing 3 is made up by using an expanded metal plate 31 in a rhomboidal mesh shape as shown in FIG. 1B. In FIG. 1B, the left drawing shows a perspective view of the mesh and the right drawing shows a sectional view in the plate thickness direction of the mesh. The expanded metal plate 31 is a plate material processed in a mesh shape by putting breaks (slits) in staggered arrangement on a plate material made of metal such as stainless, aluminum, nickel, titanium, or carbon steel and expanding the plate material. The mesh shape of the expanded metal is not only a rhomboidal shape, but also a hexagonal pattern is usable. However, the rhomboidal shape is suitably used. The expanded metal plate 31 has openings 31*b* which are formed by strands 31*a*, and the mesh structure can be identified by a center-to-center distance SW in a short mesh direction, a center-to-center distance LW in a long mesh direction, a strand thickness T, and a strand width W. By forming a metal plate into a plate material of such a mesh structure, a large number of openings 31*b* are possibly formed while strength thereof is maintained to a certain level, thereby reduction in weight becomes possible, and unevenness is possibly formed on the surface. Therefore, even when the expanded metal plate 31 is alone installed upright while treatment is performed, distortion of the shape can be suppressed and there is no need to use a member that supports the packing 3 as is a self-supporting body. Therefore, the packing 3 can be reduced in weight and miniaturized. In addition, the expanded metal plate can easily be processed and thus, the manufacturing cost of the packing 3 can be reduced.

For the material of the expanded metal plate 31, a metal that does not react with (is not corroded by) the absorbent can appropriately be selected to use and, in addition to the metals illustrated above, there are also provided those manufactured of brass, copper, monel, silver, tin and niobium that can be selected as the situation demands. Incidentally, plate materials made of resin having a mesh structure similar to that of the expanded metal are manufactured and sold by using a resin having ductility such as polyethylene, polypropylene, and PTFE and such a mesh plate material made of resin can also be used for the expanded metal plate 31. If such a mesh plate material made of resin is used, the range of application can be expanded to the gas-liquid contact/gas separation treatment using an acidic absorbent that corrodes metals in accordance with material properties of resin.

The width (indent width) W of the strand 31*a* and the dimensions (lengths of the center-to-center distance SW in the short mesh direction and the center-to-center distance LW in the long mesh direction) of the opening 31*b* can optionally be adjusted by the slit width and pulling force when the expanded metal plate is manufactured. The plate thickness T can optionally be set when a material metal plate is selected. Then, a suitable expanded metal is appropriately selected and used so as to have the size (mesh dimensions) of the opening and the plate thickness T so that the absorbent L flowing down along the expanded metal plate 31 can form a sufficient amount of liquid film on the surface. A sufficient gas-liquid contact area can be secured by the absorbent L being thinly spread to form a liquid film on the surface of the expanded metal plate 31.

The wetted spread of the absorbent L flowing down the expanded metal plate 31 changes depending on the mesh shape, and the wetted area where a liquid film is formed on the expanded metal plate 31 is different depending on an angle θ at which the strand 31a of the expanded metal plate inclines with respect to the vertical direction (angle formed between the vertical direction and the strand 31a, 0<θ≤90°). The wetted spread in a mesh shape in which the angle θ is 48 to 73° is good and an expanded metal plate 31 in which the angle θ is 50 to 70° is preferably used. Therefore, it is preferable to use the expanded metal plate 31 in an arrangement in which the short mesh direction is vertical. In this respect, the expanded metal in a rhomboidal mesh shape is advantageous when compared with common wire meshes or the like in which vertical and horizontal wire materials cross perpendicularly. From the viewpoint of forming a liquid film with high gas-liquid contact efficiency, the center-to-center distance SW in the short mesh direction is preferably about 0.6 to 8.5 mm and more preferably 1.8 to 3.0 mm. The center-to-center distance LW in the long mesh direction is preferably about 1.0 to 11 mm and more preferably 3.0 to 6.0 mm. From the viewpoints of strength and the like, the plate thickness T is preferably about 0.2 to 0.3 mm. The plate thickness T affects the wetted area, but the extent thereof is not large and a suitable liquid film can be formed with the plate thickness T in the above range.

According to examination of flow line distribution of the liquid flowing down the expanded metal plate by CFD (computational fluid dynamics) analysis, it has been found that unevenness of the expanded metal 31 has an effect of promoting mass transfer and material exchange in the liquid film. More specifically, in the examination of flow line distribution in a vertical cross section in the thickness direction of a liquid film formed when a liquid flows down along a vertical plate material, while the flow line distribution is generally uniform when the liquid flows down along a flat plate or an uneven plate whose surface is a waveform, the flow of a liquid when flowing down along an expanded metal, by contrast, is disturbed on the flow into the recess from the projecting portion and an eddy is generated in the flow line distribution of the liquid film in the recess. Accordingly, stirring and mixing of the liquid proceeds, so that diffusion and uniform distribution of components contained in the liquid are promoted. Thus, efficiency of contact between the absorbent L and the gas to be treated G is possibly improved and the ratio of absorbent L that does not contribute to the absorption of the target gas component because of staying away from the surface of the liquid film is possibly reduced. Therefore, the treatment cost can be reduced. Further, in the comparison between an expanded metal and a wire mesh, while the liquid on the wire mesh may stay in a gap, due to capillary action, of the place where the vertical wire and the horizontal wire are in contact with intersecting so that the liquid flows down along only a surface portion of the liquid film, the liquid on the expanded metal that the strands are continuous has no gap where the liquid may stay and it is uniformly mixed by repeating convergence and divergence while flowing along the surface of the inclined strands. Furthermore, flowing down of a liquid along inclined strands is always accompanied by flowing of the liquid in the transverse direction and thus, the wetted spread can be easily maintained in that structure even under the conditions where the convergence of the liquid is likely to occur due to the influence of surface tension. The expanded metal is thus advantageous. Therefore, the packing 3 using the expanded metal 31 can secure a sufficient gas-liquid contact area and contact time on the surface and improve absorption efficiency without increasing the apparatus in size.

The packing unit used for the packing 3 can be configured as shown, for example, in FIG. 2 (in FIG. 2, the expanded metal plate is depicted simply like a plate by omitting illustration of mesh). More specifically, the packing unit has a fixing member 32 that integrates a plurality of the expanded metal plates 31 and the fixing member 32 includes an annular portion 33 that integrally fixes the plurality of the expanded metal plates 31 by surrounding the outer circumference thereof, a penetration portion 34 that penetrates the plurality of the expanded metal plates 31, and spacers 35 arranged respectively in each of intervals between the plurality of the expanded metal plates 31 to maintain the intervals between the plates. By using the fixing member 32 as described above, the plurality of the thin expanded metals 31 can be integrated and also the upright body thereof can be maintained, which makes it easier to handle during transportation or installation. In FIG. 2, fitted installment into the cylindrical treatment chamber 2 is made possible by: preparing expanded metal plates each having a shape corresponding to each of a plurality of cross sections that are obtained by cutting a cylindrical shape corresponding to the loading space of the treatment chamber 2 at constant intervals in parallel with the axial direction; and integrating them into the packing 3 so that the whole shape becomes substantially cylindrical. However, such a configuration is also possible by forming the packing unit, as one block, with the expanded metal plates whose integrated shape is a substantially semicircular column shape or a substantially quadrantal column shape, and combining two or four blocks into a substantially cylindrical shape.

The whole shape of the packing unit can appropriately be changed in accordance with the shape of the treatment chamber 2 and, if the shape of the treatment chamber 2 is, for example, an elliptic cylindrical shape, quadrangular prismatic shape, or other polygonal prismatic shapes, the whole shape of the packing unit may correspondingly be changed to the elliptic shape, quadrangular prismatic shape, or other polygonal prismatic shapes so that the packing unit can be loaded to fit into the treatment chamber 2 as the packing 3. The positioning and fixing of the loaded packing unit is possibly made by, for example, a projection provided on the inner circumferential wall of the treatment chamber 2 to support the edge portion of the lower end of the packing unit, or a reticular shelf board provided in the treatment chamber 2 to mount the packing unit on it. Alternatively, the packing unit can be configured to hang in the treatment chamber 2.

Therefore, if the treatment chamber 2 has a cylindrical shape, the breadth of each expanded metal plate is determined in consideration of the intervals between the plates and the plate thickness so that the expanded metal plates 31 constitute a cylindrical outer shape that can be accommodated in the treatment chamber 2 when they are combined. If the expanded metal plates 31 are divided respectively into a plurality of portions in the plate width direction in order to constitute blocks of a substantial semicircular column shape or quadrantal column shape, each plate width is determined so that a cylindrical outer shape that can be accommodated in the treatment chamber 2 is constituted as a whole when they are combined. If the treatment chamber 2 has a rectangular column shape, the packing 3 is constituted by using a packing unit of a plurality of expanded metal plates 31 having a corresponding fixed plate width and being combined into a rectangular column shape.

The annular portion 33 is configured to be able to fix the outer circumference of the plurality of the expanded metal plates 31, for example, as shown in FIG. 3A, by combining a pair of semi-annular portions which are obtained by dividing a circular ring into two, and by connecting their flange portions 33a using fasteners such as bolts (in the drawing, the expanded metal plate is depicted simply like a plate by omitting illustration of unevenness). Although showing here a case where the annular portion 33 constitutes a circular shape when combined, the annular portion 33 may constitute, when combined, a polygonal shape corresponding to the shape inside the treatment chamber 2, or it may be divided into three portions or more or divided unequally.

As shown in FIG. 2, the annular portion 33 can be arranged, for example, in two locations (upper and lower locations) and a coupling portion 33b can be provided to connect the upper annular portion 33 and the lower annular portion 33. With the above configuration, the expanded metal plates 31 can be supported in a plurality of locations so that the body of integrated state can be maintained. Incidentally, the annular portion 33 may be arranged in three locations or more, or the coupling portion 33b may be omitted.

The penetration portion 34 is inserted into a through hole 31c formed on each of the expanded metal plates 31. The penetration portion 34 is configured of, for example, axial portions respectively formed on one of the pair of semi-annular portions so that one axial portion is formed in a hollow shape and the other axial portion is formed in a shape allowing to be fitted into the hollow of the one axial portion. With the above configuration, the other axial portion of the penetration portion 34 is inserted into one axial portion when the semi-annular portions are combined, and thus the strength necessary to support and fix the expanded metal plates 31 can be obtained. Naturally, it is also possible to configure the penetration portion 34 by a single axial portion as long as sufficient strength can be obtained and, in that case, the axial portion provided on one semi-annular portion, being inserted into the through hole 31c, may pierce the other semi-annular portion so as to be supported thereby.

The plurality of the expanded metal plates 31 constituting the packing 3 are, as shown in FIG. 2, arranged vertical at constant intervals and integrated. In this case, as shown in FIGS. 3A and 3B, the spacer 35 is inserted into each of the gaps of the expanded metal plates 31. The intervals between the expanded metal plates 31, in other words, the sectional area of the channel through which the treating gas G passes the packing 3 can arbitrarily be set by adjusting the length of the spacer 35 in the axial direction. The spacer 35 is depicted as having a circular tubular shape in FIG. 2, but the shape thereof is not limited to such an example and may be a polygonal pipe shape such as a triangular tubular shape, square tubular shape, and rhomboidal tubular shape or an elliptic tubular shape. Instead of using the spacer 35, as shown in FIG. 3C, the through hole 31c may be formed by cutting the strands of the expanded metal 31 at the place where the through hole 31c should be provided and bending (turning sharply or curving) to raise the cut ends in the plate thickness direction, so that the raised portions formed at the edge of the through hole 31c may function as the spacer 35. With the above configuration, there is no need to manufacture the spacer 35 as a separate component and thus, the time and effort to alternately insert the spacer 35 while combining the plurality of the expanded metal plates 31 can be omitted and the manufacturing cost can be reduced. The position where the raised portion is formed is not limited to the edge of the through hole 31c and, for example, the raised portion may be formed by bending a part of strand ends at upper and lower ends or both side ends of the expanded metal plates 31. The intervals between the expanded metal plates 31 are defined by adjusting a raised height h of the strand ends of the expanded metal plates 31 so that the sectional area of the channel through which the treating gas G passes in the packing 3 can arbitrarily be set. From the viewpoints of reducing pressure losses of gas supply and the contact efficiency, it is generally suitable to set the intervals between the expanded metal plates 31 to approximately 5 to 15 mm and, based on that, the length of the spacer 35 or the height h of the raised portion can appropriately be set.

The penetration portion 34 (that is, a penetration bar) passing through the aligned expanded metal plates 31 functions as a gathering member that gathers the expanded metal plates 31 in an aligned state and thus, the annular portion 33 may be omitted from the fixing member 32 to use. In other words, using only the penetration bar and the spacer 35, it is possible to gather the expanded metal plates 31 in an aligned state and maintain the intervals between the plates, and thus the expanded metal plates 31 as such can be loaded and fixed straight into the treatment chamber 2. Further, if the bent portions obtained by bending the cut ends of strands where the through hole 31c is to be provided as illustrated in FIG. 3C are used in place of the spacer 35, the plurality of the expanded metal plates 31 can be combined in an alignment to configure the packing unit by using only at least one penetration bar. In addition, if a locking member acting as a stopper is attached to both ends of the penetration bar passing through the expanded metal plates 31, the packing unit configured in this manner can be handled in the same manner as the packing unit of FIG. 2. The penetration bar only needs to have a thickness to retain the strength capable of supporting the expanded metal plates 31, and an appropriate selection thereof is made in accordance with the design of the packing unit. In general, a metallic bar of approximately 5 to 10 mm in thickness is suitably used and the size of the through holes 31c is appropriately set in accordance with the thickness of the penetration bar to be used.

According to the above packing 3, the shape of the expanded metal plates installed upright is unlikely to be distorted while the treatment is performed and thus blockage of the flow path of the gas to be treated G can be avoided. Thus the channel of the gas to be treated G can be secured with stability and an increase in pressure loss can be suppressed and therefore, degradation in energy efficiency can be inhibited. Here, the illustration is made for the case where the expanded metal plates 31 are arranged in one direction. However, if, for example, an expanded metal plate with a vertical cut put in the upper half and an expanded metal plate with a vertical cut put in the lower half are engaged with each other so as to pinch each other along the cut, the two expanded metal plates are combined so as to intersect. Therefore, applying this manner of combination, the expanded metal plates 31 can be arranged upright in a lattice pattern. In this case, the fixing member 32 described above is unnecessary.

Figure 4:
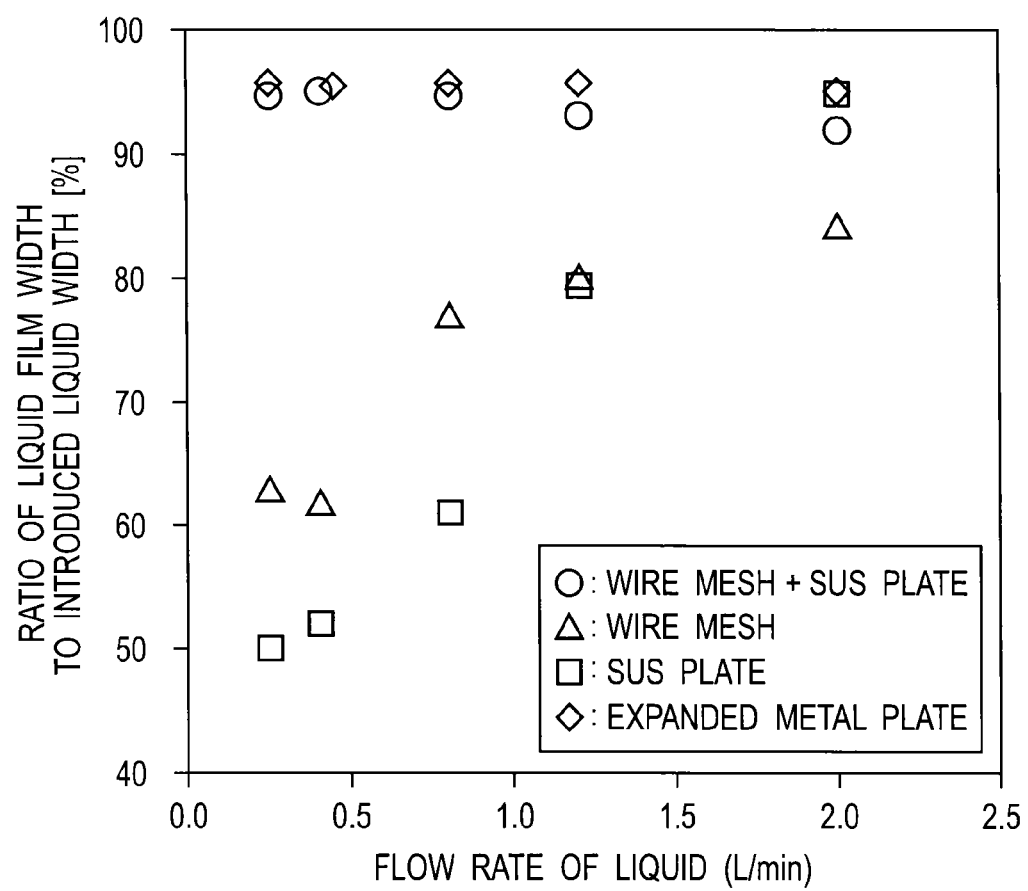
FIG. 4 is a graph showing the relationship between the flow rate of a liquid flowing down along the packing and the ratio of a liquid film width to an introduced liquid width.

When wire mesh is used for the packing, a flat plate is additionally attached, normally, to support the wire mesh and in this case, wettability is also improved due to combined use of the flat plate. In the case of the present invention where the expanded metal plate 31 is used for the packing 3, the expanded metal plate has high wettability by itself and can exhibit wettability equivalent to that of the case where a flat plate is additionally attached to the wire mesh. This can easily be understood from the graph shown in FIG. 4. FIG. 4 is a graph showing a relationship between a flow rate of a liquid when the liquid (water) is introduced to the upper end of the packing in a fixed width to allow the liquid to flow down and the ratio [%] of the liquid film width formed on the packing by the liquid flowing downward to the introduced liquid width (which will be described later in detail). According to FIG. 4, when the wire mesh or the flat plate (SUS plate) is used alone, the liquid film width decreases with decrease in amount of the liquid allowed to flow down and, if the flat plate is additionally attached to the wire mesh, the liquid film width is maintained even when the amount of liquid decreases. In contrast to the above, when the expanded metal plate is used alone, the liquid film width is maintained even if the amount of liquid decreases and wettability equivalent to that when the flat plate is additionally attached to the wire mesh is exhibited. Therefore, there is no need to additionally attach a flat plate for the purpose of improving wettability and thus, the use of expanded metal plates is quite advantageous for weight reduction and miniaturization of the packing.

Figure 5:
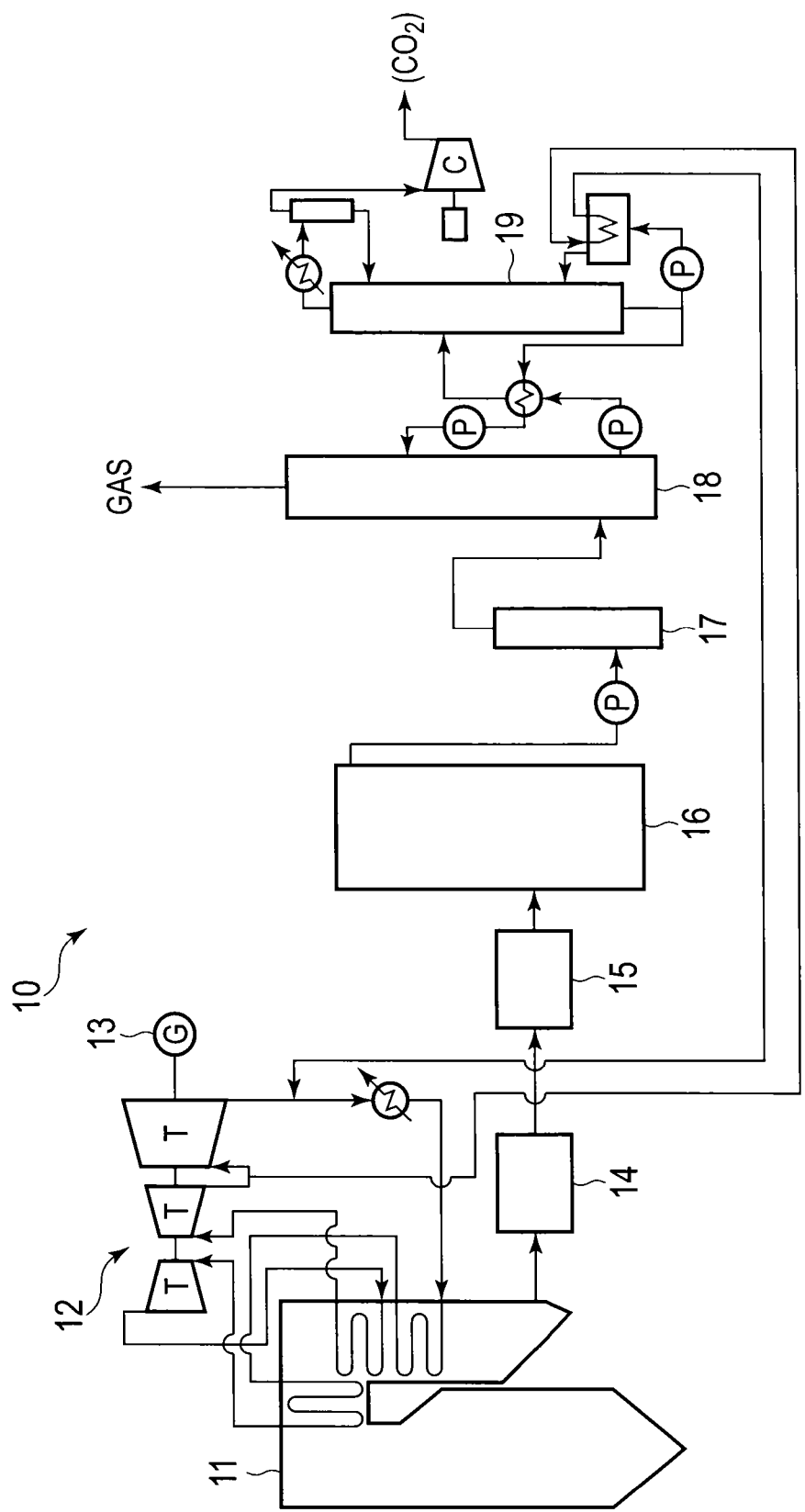
FIG. 5 is a schematic configuration diagram of a thermal power station equipped with a gas-liquid contact apparatus according to the present invention.

Description of a case where the gas separation apparatus 1 according to the above embodiment is applied to a thermal power station 10 will be made with reference to FIG. 5. FIG. 5 is a schematic configuration diagram of a thermal power station equipped with the gas separation apparatus according to the embodiment of the present invention.

The thermal power station 10 comprises, as shown in FIG. 5, a boiler 11 that burns and converts fossil fuel such as coal into thermal energy, a turbine 12 that converts thermal energy into kinetic energy, a power generator 13 that converts kinetic energy into electric energy, an exhaust gas NOx removal equipment 14 that removes nitrogen oxides (NOx) from an exhaust gas discharged from the boiler 11, an electrostatic precipitator (electric dust collector) 13 that removes dust from the exhaust gas, an exhaust gas desulfurization equipment 16 that removes sulfur oxides from the exhaust gas, a pretreatment tower 17 that further removes sulfur oxides from the exhaust gas, an absorber 18 that removes carbon dioxide from the exhaust gas, and a stripper 19 that recovers carbon dioxide from a liquid after the absorption by the absorber 18.

The illustrated thermal power station 10 is of the steam power station type that burns fossil fuel such as heavy oil, LNG (liquefied natural gas), coal and the like to generate steam at high temperature and high pressure in the boiler 11 and drives the turbine 12 with the steam to rotate the power generator 13 and generate electricity.

The exhaust gas discharged from the boiler 11 is transferred to each device in the order of the exhaust gas NOx removal equipment 14, the electrostatic precipitator 15, the exhaust gas desulfurization equipment 16, the pretreatment tower 17, and the absorber 18 and treated so that amounts of impurities and contaminants contained in the exhaust gas fall to fixed reference values before being released into the atmosphere in the end.

The exhaust gas NOx removal equipment 14 removes nitrogen oxides contained in the exhaust gas by using, for example, the ammonia catalytic reduction method, non-catalytic reduction method, activated carbon method, electron beam irradiation method, oxidation-reduction method or the like. The electrostatic precipitator 15 removes dust in the exhaust gas by, for example, causing a corona discharge through a direct current to charge dust in the exhaust gas and causing the charged dust to pass through an electric field. The exhaust gas desulfurization equipment 16 removes sulfur oxides contained in the exhaust gas by using, for example, the alkaline solution absorption method, lime slurry absorption method, magnesium hydrate slurry method, spray drier method, activated carbon adsorption method or the like. The pretreatment tower 17 removes sulfur oxides (SOx) in the exhaust gas that are still unremoved at the preceding steps. The absorber 18 removes carbon dioxide in the exhaust gas that is not removed at the preceding steps.

The gas separation apparatus 1 according to the above embodiment can be applied to the absorber 18. The gas to be treated G is an exhaust gas supplied from the pretreatment tower 17, the target gas component is carbon dioxide, and the absorbent L is an aqueous amine compound solution. More specifically, the absorbent L is, for example, an aqueous monoethanolamine (MEA) solution, and carbamate salt/amine salt (carbamate), carbonate, bicarbonate and the like are generated by the absorption of carbon dioxide. The used absorbent containing these salts is recovered and supplied to the stripper 19.

The above gas separation apparatus 1 can also be applied to the pretreatment tower 17 and, in this case, the gas to be treated G is an exhaust gas discharged from the exhaust gas desulfurization equipment 16, the target gas component is sulfur oxides, and the absorbent L is a basic aqueous liquid. The above aqueous amine compound solution may be used as the absorbent L, but an aqueous solution of alkali metal hydroxide such as sodium hydroxide and potassium hydroxide is normally used.

The stripper 19 causes the used absorbent L' to release carbon dioxide removed from the exhaust gas. More specifically, the stripper 19 heats the used absorbent L' supplied to 100° C. or more and causes it to release carbon dioxide, and it also cools and condenses vapor released together with the released carbon dioxide and compresses and recovers carbon dioxide after removing condensed water by gas-liquid separation. The absorbent after carbon dioxide being released is supplied to the absorber 18 as the regenerated absorbent L and reused. In addition, recovered liquid $CO_2$ is stored underground or on the seabed as carbon dioxide capture and storage (CCS) or used for other purposes.

The above gas separation apparatus 1 can also be applied to the stripper 19, but in this case, a heating device to heat the absorbent is necessary. For example, by heating the absorbent stored at the bottom of the treatment chamber 2 in FIG. 1A, carbon dioxide is released from the absorbent at the bottom and rises, thereby the packing 3 is also heated. The absorbent supplied from the upper portion is heated and brought into gas-liquid contact while flowing down along the packing 3, and release of carbon dioxide in the absorbent is promoted.

As described above, the target gas component to be absorbed/separated is not limited to carbon dioxide and may be an oxidation gas such as $NO_x$ and $SO_x$, or any other gas that can be separated by the gas separation apparatus 1 according to the present embodiment can be selected. The absorbent L is not limited to the aqueous amine compound solution and any reacting liquid suitable to the target gas to be separated can be selected. If, for example, the target gas component is a hydrophilic substance, water or a hydrophilic solvent can be used as the absorbent and, if the target gas component is a lipophilic substance, a lipophilic solvent can be used as the absorbent. If the target gas component is an acid material, a basic liquid or neutral liquid is used as the absorbent and, if the target gas component is a basic material, an acid liquid or neutral liquid is used as the absorbent. Further, a gas separation apparatus in the present invention may be applied to gas treatment in which the target gas component absorbed by the absorbent L changes to another substance as a result of a chemical reaction in the absorbent.

In FIG. 5, description is made for a case where the gas separation apparatus 1 according to the present embodiment is applied to the thermal power station 10. Since the packing 3 according to the present invention is small and light and can perform gas-liquid contact efficiently, it can also be applied to packings of apparatuses (a distillation tower, a purification tower and the like) used in various chemical plants including physical/chemical processes such as distillation and purification.

EXAMPLES (Evaluation of Expanded Metal Plates as the Packing)

The following four specimens A to D were prepared and each of the specimens was evaluated while used as the packing in Test Method 1 below.

A: Wire mesh made of SUS304 of 20 meshes (wire diameter: 0.2 mm, wire direction: vertical and horizontal, mesh dimension: 1.25 mm×1.25 mm)

B: SUS plate whose surface is polished smoothly by a sandblast (average roughness: about 5 μm)

C: An object obtained by fixing the wire mesh of Specimen A on the surface of the SUS plate of the specimen B using an adhesive D: Expanded metal plate made of SUS304 in a rhomboidal mesh (plate thickness T: 0.3 mm, center-to-center distance SW in the short mesh direction: 1.8 mm, center-to-center distance LW in the long mesh direction: 3.0 mm); arranged and used by setting the short mesh direction to the vertical direction (Test Method 1)

Preparing an inclined flat plate for introducing a liquid and installing the packing upright, they were arranged so that the lower end of the inclined flat plate and the upper end of the packing were brought into contact, and a liquid (water) was supplied to the inclined flat plate at a fixed flow rate to uniformly introduce the liquid to the upper end of the packing in a width (introduced liquid width) of 380 mm with allowing the liquid to flow down along the packing. An image of a liquid film formed by the liquid flowing downward on the packing (wet portion where the liquid flows) was created using a camera, by photographing the packing at a shooting angle perpendicular to the packing (that is, horizontal) from the front side (the wire mesh side for the specimen C). In this operation, the flow rate of the liquid was successively decreased from 2.0 L/min to 1.2 L/min, 0.8 L/min, 0.4 L/min, and 0.25 L/min stepwise and shooting was repeated to create an image of the liquid film at each flow rate.

The obtained images were used to measure the liquid film width (breadth of a portion wet with the liquid) in a position 200 mm downward from the upper end of the packing for each flow rate, and the ratio [%] of the liquid film width to the introduced liquid width (380 mm) was respectively calculated to examine its change depending on the flow rate of the liquid. The result is shown in FIG. 4. In FIG. 4, the result of the specimen A is represented by a triangular mark, the result of the specimen B is represented by a quadrangular mark, the result of the specimen C is represented by a circular mark, and the result of the specimen D is represented by a rhomboidal mark.

According to FIG. 4, the ratio of the liquid film width to the introduced liquid width rapidly decreases with decreasing in flow rate of the liquid for the specimens A (wire mesh) and B (SUS plate) and the breadth of the liquid flowing downward becomes narrower markedly. That is, it becomes more difficult to be wet and the surface area of the liquid film (gas-liquid contact area) rapidly decreases. This is considered to result from the fact that, when the flow rate is low, the liquid film is likely to converge due to the influence of surface tension. In the specimen D (expanded metal plate), by contrast, even when the flow rate of the liquid decreases, the ratio of the liquid film width does not decrease and the liquid flowing downward does not become much narrower. That is, wetting is maintained and the surface area of the liquid film (gas-liquid contact area) is maintained. This can be understood as the result of a structure that the wetted spread of the liquid in the transverse direction can be easily maintained with the liquid flowing down along the inclined continuous strands. Therefore, it is known from the above that the expanded metal plate is the packing for which it is unnecessary to restrict the flow rate for maintaining the gas-liquid contact area, and which is thus highly advantageous in increasing of the absorption efficiency of the liquid with decreasing the flow rate.

In the specimen A, even when the flow rate of the liquid is high, the liquid film width is narrow in comparison with the other specimens B to D, and an occurrence of distortion/deformation in the shape of the wire mesh has been observed during the test, producing a gap between the lower end of the inclined flat plate and the upper end of the wire mesh. Therefore, it is understood that the flexible wire mesh of low strength is likely to be deformed (particularly in the bias direction) under the weight of the liquid and is to be in a state in which it is difficult for the liquid to flow down uniformly. This can be improved by attaching the wire mesh to a flat plate, like the specimen C, and the fact that the liquid film width when the flow rate is lower is still maintained in the specimen C is considered to result from flowing down along the flat plate. According to FIG. 4, the specimen C and the specimen D have approximately equivalent functions in the formation of a liquid film and the ratio of the liquid film width to the introduced liquid width is generally maintained in the range of 90 to 100%, but in consideration of the facts that the specimen C structurally needs a certain thickness and needs pasting, it is clear that the specimen D is advantageous. Therefore, the expanded metal plate is the excellent packing that is capable of maintaining excellent wetting by itself regardless of the flow rate of the liquid and is a useful material that can contribute to miniaturization and weight reduction of an apparatus configured by using the packing since it does not need a member for reinforcement.

(Test Method 2)

Arranging a thin-plate packing of the breadth 500 mm×length 645 mm vertically, a string was tied to both ends at an upper end thereof and the string was used to hang the packing from a load cell. Further preparing a metal tube (inner diameter: 23.3 mm, length: 200 mm) as a nozzle to supply a liquid (water), the nozzle was arranged vertically above the center of the upper end of the packing, and the liquid was supplied to the packing at a fixed flow rate through the nozzle to allow the liquid to flow downward (distance of flowing down: 645 mm). An image of a liquid film formed by the liquid flowing downward on the packing (wet portion where the liquid flows) was created using a camera, by photographing the packing at a shooting angle perpendicular to the packing.

The obtained images were used to measure the area of the liquid film (area of a portion wet with the liquid) formed on the packing and the measured area was set as the wet area of the packing. In the meantime, a load cell was used to measure the weight of the packing, and the validity of the area value of the liquid film measured from the image was verified by determining the weight of the liquid which was wetting the packing, based on the difference between the weights before and after the liquid was supplied.

(Influence of the Thickness of the Expanded Metal Plate)

Figure 6:
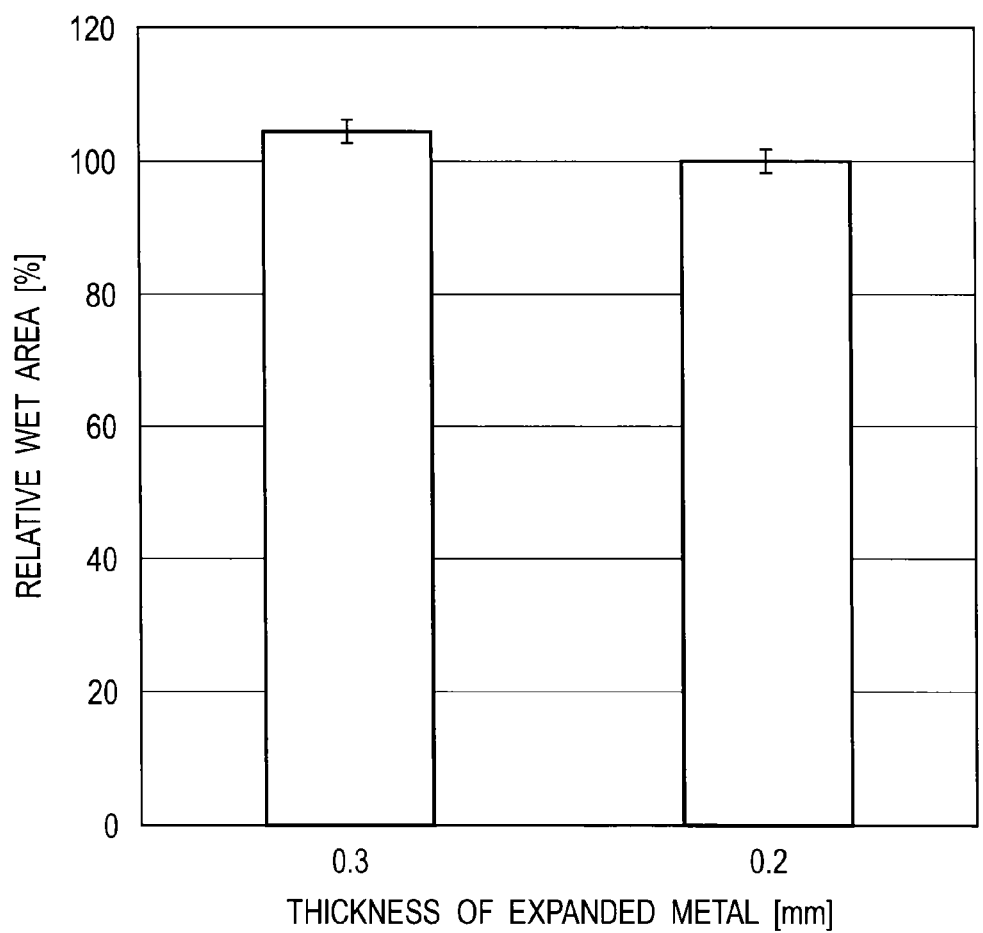
FIG. 6 is a bar chart showing changes in relative wet area depending on the thickness of an expanded metal.

Preparing the following two specimens D1, D2, each of the specimens was used as the packing in Test Method 2 to measure the wet area in each specimen. The measured value obtained was converted into a relative wet area [%] that was a value relative to the wet area of the specimen D1 (100%). A bar graph for comparison based on the thickness of the specimens D1, D2 is shown in FIG. 6.

D1: Expanded metal plate made of SUS304 in a rhomboidal shape (plate thickness T: 0.2 mm, center-to-center distance SW in the short mesh direction: 1.8 mm, center-to-center distance LW in the long mesh direction: 3.0 mm); arranged and used by setting the short mesh direction to the vertical direction D2: Expanded metal plate made of SUS304 in a rhomboidal shape (plate thickness T: 0.3 mm, center-to-center distance SW in the short mesh direction: 1.8 mm, center-to-center distance LW in the long mesh direction: 3.0 mm); arranged and used by setting the short mesh direction to the vertical direction According to FIG. 6, about 5% difference occurs in the wet area between the specimen D1 of 0.2 mm in thickness and the specimen D1 of 0.3 mm in thickness. In the evaluation of the expanded metal plates described later, an error in the comparative evaluation including specimens of different thicknesses can be considered to be such a level. From the viewpoints of the weight reduction and strength of the packing, an expanded metal plate having a thickness as described above is preferable.

(Evaluation 1 of the Mesh of the Expanded Metal Plates)

Preparing the following specimens D3 and E1 to E5, each of these specimens was used as the packing in the above Test Method 2 to measure the wet area in each specimen. The measured value obtained was converted into a relative wet area [%] that was a value relative to the wet area of the specimen E3 (100%).

D3: Expanded metal plate made of SUS304 in a rhomboidal shape (plate thickness T: 0.3 mm, center-to-center distance SW in the short mesh direction: 3.0 mm, center-to-center distance LW in the long mesh direction: 6.0 mm); arranged and used by setting the short mesh direction to the vertical direction E1: Expanded metal plate made of SUS304 in a rhomboidal shape (the specimen D4, plate thickness T: 0.2 mm, center-to-center distance SW in the short mesh direction: 2.5 mm, center-to-center distance LW in the long mesh direction: 6.0 mm) fixed to the surface of the SUS plate of the specimen B by diffusion bonding; arranged and used by setting the long mesh direction to the vertical direction E2: Expanded metal plate of the specimen D1 fixed to the surface of the SUS plate of the specimen B by diffusion bonding; arranged and used by setting the long mesh direction to the vertical direction E3: Expanded metal plate of the specimen D1 fixed to the surface of the SUS plate of the specimen B by diffusion bonding; arranged and used by setting the short mesh direction to the vertical direction E4: Expanded metal plate made of SUS304 in a rhomboidal shape (the specimen D5, plate thickness T: 0.2 mm, center-to-center distance SW in the short mesh direction: 2.25 mm, center-to-center distance LW in the long mesh direction: 4.0 mm) fixed to the surface of the SUS plate of the specimen B by diffusion bonding; arranged and used by setting the short mesh direction to the vertical direction E5: Expanded metal plate of the specimen D4 fixed to the surface of the SUS plate of the specimen B by diffusion bonding; arranged and used by setting the short mesh direction to the vertical direction The angle $\theta$ ($0<\theta \leq 90°$) inclined with respect to the vertical direction of strands of the expanded metal plate was determined as follows for each of the specimens D3 and E1 to E5. A bar graph to examine the relationship between the determined angle $\theta$ and the relative wet area obtained as described above is shown in FIG. 7.

D3: $\theta=63.4°$, E1: $\theta=22.6°$, E2: $\theta=31.0°$
E3: $\theta=59.0°$, E4: $\theta=60.6°$, E5: $\theta=67.4°$ The specimen E1 and the specimen E5 use expanded metal plates of the same mesh in the arrangement of vertical long mesh or horizontal long mesh, which are different from the expanded metal plates used in the specimens E2 to E4, and D3 in mesh dimensions, and in the result of FIG. 7, a correlation between the angle $\theta$ and the relative wet area is clearly observed and it is understood that the influence of the angle $\theta$ (orientation of the mesh) is obviously larger than that of mesh dimensions.

Comparison of the specimens E1 to E5 shows that the relative wet area rapidly increases with increase in angle $\theta$ of strands from 22.6° to 59.0° and clearly high wettability is exhibited in the range of 59.0° to 67.4° (particularly around 60°). From the above result, 80% of the relative wet area or more can clearly be expected in the range of the angle $\theta$ of about 48 to 73°, and 90% or more can be expected in the range of about 50 to 70°. The specimens E1 to E5 are prepared by fixing an SUS plate to an expanded metal plate, but the expanded metal plate alone also shows a tendency similar to that of the specimens E1 to E5 in the relationship between the angle $\theta$ and wet area, and the fact that the wet area is the largest near 60° can be verified in Evaluation 2 of the mesh of the expanded metal plates, which is described below.

(Evaluation 2 of the Mesh of the Expanded Metal Plate)

Figure 8:
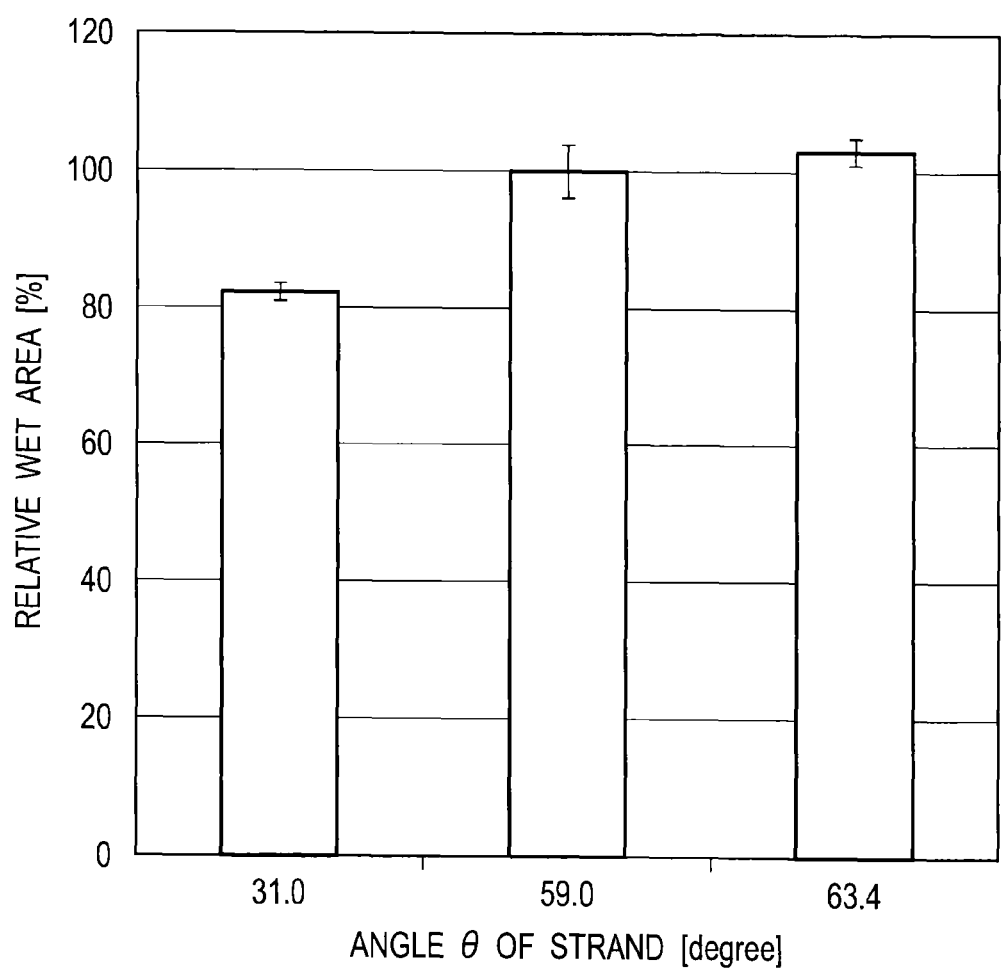
FIG. 8 is a bar chart showing the relationship between an angle $\theta$ of the strands of an expanded metal and the relative wet area.

The following specimen D2' was prepared and used as the packing in the above Test Method 2 to measure the wet area in each specimen. The measured value of the specimen D2' obtained and the measured value of the specimen D3 obtained as described above were converted into relative wet areas [%] that were values relative to the wet area of the specimen D2 (100%) measured as described above. For the specimens D2, D2', D3, a bar graph to examine the relationship between the angle $\theta$ with respect to the vertical direction of strands of the expanded metal plate and the relative wet area is shown in FIG. 8. The angle $\theta$ of each specimen is as follows: D2: 59.0°, D2': 31.0°, D3: 63.4°

Figure 7:
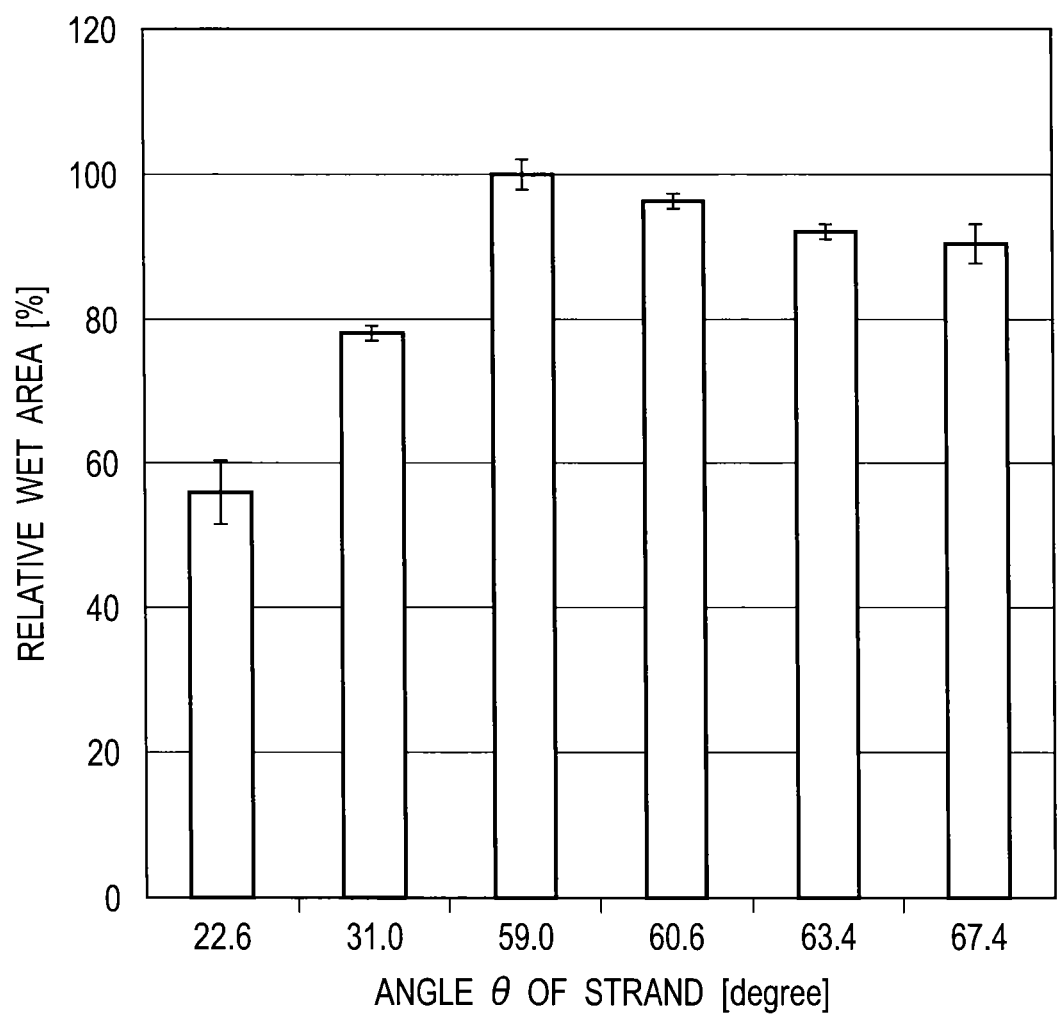
FIG. 7 is a bar chart showing the relationship between an angle $\theta$ of strands of the expanded metal and the relative wet area.

D2': Expanded metal plate of the specimen D2; arranged and used by setting the long mesh direction to the vertical direction FIG. 8 shows the results when the expanded metal plates are used alone and, like in FIG. 7, the relative wet area increases as the angle $\theta$ increases from about 30° to about 60°, which is clearly a trend similar to that in FIG. 7. This can be verified by relatively converting the results of FIG. 8 so that the values of the specimen D3 ($\theta=63.4°$) coincide in FIG. 7 and FIG. 8 and overlapping the converted FIG. 8 on the results of FIG. 7. Comparison of FIG. 7 and FIG. 8 shows that variations of the relative wet area depending on the angle $\theta$ in the expanded metal plate itself tend to be emphasized by attaching of the SUS plate. The angle $\theta$ at which the wet area is largest seems to be a little larger when the expanded metal plate is used alone than that when the SUS plate is attached, but it is considered there is no great difference in the range of angle at which a suitable wet area is obtained.

(Evaluation of Wetting by the CFD Analysis)

Using each of a smooth plate, a plate whose surface had unevenness in a waveform (uneven amplitude 2a=0.6 mm, wavelength λ=2.8 mm, arranged so that the convex portions were horizontal), and an expanded metal plate (plate thickness T: 0.3 mm, center-to-center distance SW in the short mesh direction: 1.8 mm, center-to-center distance LW in the long mesh direction: 3.0 mm) as a packing (dimensions: 50 mm×60 mm), and behavior of a liquid film formed by a liquid when the packing was arranged vertically and the liquid was caused to flow down from the whole upper end of the packing at a fixed flow rate was examined by a simulation based on the CFD (computational fluid dynamics) analysis. As a result of the analysis, the liquid converged to the center and the liquid film width rapidly became narrower as the liquid flowed down along the smooth plate. In the case of the plate having unevenness in a waveform, the convergence of the liquid was slow when compared with the smooth plate, but the convergence to the center also occurred when the liquid flowed down a certain distance. In the case of the expanded metal plate, the convergence was slow like the plate having unevenness in a waveform.

In the above analysis, when the flow line distribution of the liquid in a vertical cross section in the thickness direction of the liquid film formed by the liquid flowing down along the packing was examined at the center of the packing, it showed that, while the flow line distribution of the liquid flowing down along the smooth plate or the plate having unevenness in a waveform was generally uniform, the liquid flowing down along the expanded metal plate showed that the flow of liquid from a projecting portion to a recess was disturbed and an eddy generated in the flow line distribution in a liquid film of the recess. A generation of eddy is useful for stirring and mixing of the liquid and diffusion and uniformity of components contained in the liquid can be promoted.

INDUSTRIAL APPLICABILITY

A gas separation apparatus in the present invention achieves high treatment efficiency in the packing and can be configured to be light and small and therefore, a gas separation apparatus that is small and light and can reduce the manufacturing cost and treatment cost can be provided. It is thus very advantageous when applied to a carbon dioxide recovery apparatus that separates or recovers carbon dioxide from a combustion exhaust gas or the like to prevent global warming, an exhaust gas cleaning equipment to remove a toxic gas from an exhaust gas, or a gas separation apparatus to separate a specific gas component contained in a mixed gas.

As there are many apparently widely different embodiments of the present invention that may be made without departing from the spirit and scope thereof, it is to be understood that the invention is not limited to the specific embodiments thereof, except as defined in the appended claims.

What is claimed is:

1. A gas separation apparatus which causes an absorbent supplied from above a packing to flow down along a surface of the packing of the gas separation apparatus arranged in a treatment chamber and supplies to the treatment chamber a gas to be treated containing a target gas component so that the absorbent flowing down along the surface of the packing and the gas to be treated are brought into gas-liquid contact, thereby the target gas component contained in the gas to be treated is absorbed in the absorbent to separate or recover from the gas to be treated, wherein the packing includes at least one packing unit formed of a plurality of expanded metal plates standing vertically and being aligned, the plurality of expanded metal plates being formed of strands which are inclined at an angle with respect to a vertical direction, the angle being from forty-eight to seventy-three degrees, and wherein the expanded metal plates have a mesh structure where a center-to-center distance in a long mesh direction is 1.0 to 6.0 mm.

2. The gas separation apparatus according to claim 1, further comprising:

the treatment chamber in which the packing is arranged, a gas introduction portion which introduces the gas to be treated to the treatment chamber, and an absorbent supply portion which supplies the absorbent to the packing, the absorbent supply portion having a sprinkler disposed above the packing to supply the absorbent from above the packing, wherein the plurality of expanded metal plates in the packing unit are aligned at constant intervals.

3. The gas separation apparatus according to claim 1, wherein the packing unit comprises a gathering member to gather the plurality of expanded metal plates in an aligned state, and a spacer to provide a fixed interval between the plurality of expanded metal plates.

4. The gas separation apparatus according to claim 3, wherein the gathering member has a penetration member that penetrates the plurality of expanded metal plates.

5. The gas separation apparatus according to claim 4, wherein the plurality of expanded metal plates have a through hole to allow the penetration member to penetrate.

6. The gas separation apparatus according to claim 4, wherein the spacer includes a tubular member which is arranged between the plurality of expanded metal plates and through which the penetration member penetrates.

7. The gas separation apparatus according to claim 3, wherein the spacer includes a raised portion formed by bending a part of strands constituting the plurality of expanded metal plates.

8. The gas separation apparatus according to claim 5, wherein the spacer includes a raised portion formed by bending a part of strands constituting the plurality of expanded metal plates to stand in a plate thickness direction at an edge of the through hole.

9. The gas separation apparatus according to claim 1, wherein the packing unit further comprises an annular member that surrounds an outer circumference of the plurality of expanded metal plates to integrally fix the plurality of expanded metal plates.

10. The gas separation apparatus according to claim 1, wherein the angle is from fifty degrees to seventy degrees.

11. The gas separation apparatus according to claim 1, further comprising:

the absorbent; and the treatment chamber.

12. The gas separation apparatus according to claim 1, wherein the center-to-center distance in the long mesh direction is 3.0 to 6.0 mm.

13. The gas separation apparatus according to claim 1, wherein the gas is exhaust gas, and the gas separation apparatus is configured to recover carbon dioxide from the exhaust gas.

14. The gas separation apparatus according to claim 1, wherein the mesh structure for each of the expanded metal plates is the same, including the center-to-center distance in the long mesh direction.

15. The gas separation apparatus according to claim 1,
wherein the treatment chamber includes a first discharge port configured to discharge the gas after treatment of the gas, a first supply port configured to supply the absorbent to the packing, a second supply port configured to provide the gas to the packing, and a second discharge port configured to discharge the absorbent after treatment of the gas,
wherein the first discharge port is above the first supply port, which is above the second supply port, which is above the second discharge port, and
wherein the gas separation apparatus is arranged such that the absorbent is supplied to a top end of the packing and flows to a bottom end of the packing opposite the top end.

16. A packing for use in a gas separation apparatus that causes an absorbent to absorb a target gas component contained in a gas to be treated, in such a manner that the absorbent supplied from above the packing flows down along a surface of the packing to bring the absorbent and the gas to be treated into sufficient contact, the packing comprising:
    at least one packing unit including a plurality of expanded metal plates standing vertical and being aligned,
    wherein the plurality of expanded metal plates are formed of strands which are inclined at an angle with respect to a vertical direction, the angle being from forty-eight to seventy-three degrees, and
    wherein the expanded metal plates have a mesh structure where a center-to-center distance in a long mesh direction is 1.0 to 6.0 mm.

17. The packing according to claim 16, wherein the angle is from fifty degrees to seventy degrees.

18. The packing according to claim 16, wherein the center-to-center distance in the long mesh direction is 3.0 to 6.0 mm.

19. A method of separating carbon dioxide using a gas separation apparatus to recover carbon dioxide from an exhaust gas, the gas separation apparatus being configured to cause an absorbent to flow down along a surface of a packing arranged in a treatment chamber and supply to the treatment chamber a gas to be treated containing a target gas component so that the absorbent flowing down along the surface of the packing and the gas to be treated are brought into gas-liquid contact, thereby the target gas component contained in the gas to be treated is absorbed in the absorbent to separate or recover from the gas to be treated, wherein the target gas component is carbon dioxide, the absorbent is an aqueous amine compound solution, and the packing comprises at least one packing unit formed of a plurality of expanded metal plates standing vertically and being aligned, the plurality of expanded metal plates being formed of strands which are inclined at an angle with respect to a vertical direction, the angle being from forty-eight to seventy-three degrees, and the expanded metal plates having a mesh structure where a center-to-center distance in a long mesh direction is 1.0 to 6.0 mm, the method comprising:
    supplying the exhaust gas to the gas separation apparatus; and
    supplying the absorbent to the packing in the gas separation apparatus from above the packing.

* * * * *